US006545713B1

(12) United States Patent
Watanabe

(10) Patent No.: US 6,545,713 B1
(45) Date of Patent: Apr. 8, 2003

(54) SOLID-STATE IMAGE PICKUP APPARATUS

(75) Inventor: Tohru Watanabe, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/014,944

(22) Filed: Jan. 28, 1998

(30) Foreign Application Priority Data

Jan. 31, 1997 (JP) .............................. 9-019146
Feb. 13, 1997 (JP) .............................. 9-029341

(51) Int. Cl.[7] ............................ H04N 3/14; H04N 5/335
(52) U.S. Cl. ........................ 348/311; 348/312; 348/282
(58) Field of Search ................................. 348/311, 312, 348/315, 316, 282

(56) References Cited

U.S. PATENT DOCUMENTS

| | | | | | |
|---|---|---|---|---|---|
| 4,281,339 A | * | 7/1981 | Morishita et al. | ............ | 348/236 |
| 4,907,089 A | * | 3/1990 | Yamaguchi et al. | ......... | 348/302 |
| 5,144,444 A | * | 9/1992 | MacLean | .................... | 348/250 |
| 5,523,786 A | * | 6/1996 | Parulski | ...................... | 348/221 |
| 5,572,155 A | * | 11/1996 | Tamayama | .................... | 327/94 |
| 5,625,414 A | * | 4/1997 | Manning | ..................... | 348/312 |

FOREIGN PATENT DOCUMENTS

JP          Hei-8-154253          6/1996

* cited by examiner

*Primary Examiner*—Andrew Christensen
*Assistant Examiner*—Eric Wisdahl
(74) *Attorney, Agent, or Firm*—Hogan & Hartson, LLP

(57) ABSTRACT

In an output section (11d) of an image sensor (11), information charges are discharged from a capacitance at a reset clock φr1, which is twice the period of a horizontal clock φh, and the information charges for two pixels are accumulated in the capacitance. In two steps, a sample-and-hold circuit (14) inputs an image signal Y0(t) that is output from the output section (11d) and outputs an image signal Y1(t) in which a period representing the information charge for one pixel and a period representing the information charges for two pixels alternately repeat. By taking the difference between the value of the period representing the information charges of two pixels and the value of the period representing the information charge of one pixel in the image signal Y1(t), the information charge of each pixel can be individually determined.

13 Claims, 11 Drawing Sheets

SOLID-STATE IMAGE PICKUP APPARATUS

BACKGROUND OF THE INVENTION

1. Field of the Invention

The present invention relates to a solid-state image pickup apparatus using a CCD image sensor, and more particularly to an improvement of output characteristics in an output section of such an image sensor.

2. Description of the Related Art

For solid-state image pickup, such as used in TV cameras equipped with a CCD image sensor, scanning timing is set based on synchronization signals in accordance with a predetermined television format. For example, in the NTSC format, the vertical scanning period is set to 1/60 second and the horizontal scanning period is set to 2/525 of the vertical scanning period. The result is that the picture information for a single image plane is output in the form of successive picture signals, one horizontal line at a time.

FIG. 1 is a block diagram showing the basic structure of an image pickup apparatus that uses a CCD image sensor, while FIGS. 2 and 3 are timing charts illustrating the operations thereof.

A typical frame transfer type CCD image sensor 1 comprises an image pickup portion 1$i$, a storage portion 1$s$, a horizontal transfer section 1$h$, and an output section 1$d$. The image pickup portion 1$i$ comprises a plurality of parallelly arranged CCD shift registers, where a plurality of bits follow in succession in the vertical direction. Respective bits of these shift registers form optical pixels and accumulate information charges, which are generated by input light during an image pickup period. The storage portion 1$s$ comprises a plurality of CCD shift registers, which are arranged in succession to the respective shift registers of the image pickup portion 1$i$, and wherein the number of bits corresponds to the respective shift registers. The bits of these shift registers temporarily store respective information charges that are transferred out from the pixels of the image pickup portion 1$i$. The horizontal transfer section 1$h$ comprises a single CCD shift register, the bits of which are connected to the outputs of the shift registers of the storage portion 1$s$. The information charges, which are transferred one horizontal line at a time from the storage portion 1$s$, are transferred in sequence to the output section 1$d$. The output section 1$d$ comprises a capacitance for receiving information charges and is provided at the output side of the horizontal transfer section 1$h$. The output section 1$d$, the capacitance of which receives information charges that are transferred out from the horizontal transfer section 1$h$, outputs voltage values proportional to the charge amounts. Changes in the voltage values that are output become an image signal Y0(t).

A drive circuit 2 comprises a frame clock generator portion 2$f$, a vertical clock generator portion 2$v$, a horizontal clock generator portion 2$h$, a reset clock generator portion 2$r$, and a sampling clock generator portion 2$s$. The frame clock generator portion 2$f$ generates in response to a frame shift timing signal FT a frame clock $\phi$f for supply to the image pickup portion 1$i$. The information charges that have accumulated in the pixels of the image pickup portion 1$i$ are transferred at a high speed to the storage portion 1$s$ each vertical scanning period. The vertical clock generator portion 2$v$ generates a vertical clock $\phi$v for the storage portion 1$s$ in response to a vertical synchronization signal VT and a horizontal synchronization signal HT. As a result, as the information charges that are transferred out from the image pickup portion 1$i$ are captured and temporarily stored, and the stored information charges are then transferred one horizontal line at a time to the horizontal transfer section 1$h$ during each horizontal scanning period. The horizontal clock generator portion 2$h$ generates in response to the horizontal synchronization signal HT a horizontal transfer clock $\phi$h for supply to the horizontal transfer section 1$h$. As a result, the information charges that were captured one horizontal line at a time in the horizontal transfer section 1$h$ from the storage portion 1$s$ are transferred in sequence to the output section 1$d$. The reset clock generator portion 2$r$ generates, in synchronization with the operation of the horizontal clock generator portion 2$h$, a reset clock $\phi$r for supply to the output section 1$d$ for discharging the information charges that are stored in the capacitance of the output section 1$d$. As a result, the information charges that are output from the horizontal transfer section 1$h$ to the output section 1$d$ are stored in the capacitance of the output section 1$d$ in one pixel units. The sampling clock generator portion 2$s$, similar to the reset clock generator portion 2$r$, then generates a sampling clock $\phi$s for supply to a sample-and-hold circuit 4 in synchronization with the operation of the horizontal clock generator portion 2$h$ for sequentially sampling the image signal Y0(t).

A timing control circuit 3 operates based on a reference clock CLK having a fixed period, and generates the vertical synchronization signal VT and horizontal synchronization signal HT, which determine the respective timing of the vertical scanning and horizontal scanning of the image sensor 1, for supply to the drive circuit 2. The timing control circuit 3 also generates the frame shift timing signal FT at a period coinciding with the vertical synchronization signal VT for supply to the drive circuit 2. The timing control circuit 3 performs shutter control to discharge the information charges of the image pickup portion 1$i$ during the vertical scanning period corresponding to the amount of information charges generated at the image pickup portion 1$i$ in order to maintain an optimum light exposure state of the image sensor 1. In other words, when the timing of the shutter operation is made faster, the period lengthens from the start of accumulation of the information charges until the start of frame transfer, and the accumulation of information charges is performed for a longer period at image pickup portion 1$i$. Conversely, when the timing of the shutter operation is made slower, the period shortens from the start of accumulation of the information charges until the start of frame transfer, and the accumulation of information charges is performed for a short period at image pickup portion 1$i$. The shutter operation for discharging the information charges of the image pickup portion 1$i$ is accomplished through the action of a drive clock, which is supplied from the drive circuit 2 to the image sensor 1.

The sample-and-hold circuit 4 generates the image signal Y1(t) for maintaining signal levels by sampling the image signal Y0(t) in response to the sampling clock $\phi$s supplied from the sampling clock generator portion 2$s$. Normally, since charging and discharging of the capacitance in the output section 1$d$ repeat according to reset clock $\phi$r, a reset level and a signal level, which corresponds to the information charge amount, alternately repeat in the image signal Y0(t) that is obtained from the output section 1$d$. The phase of the sampling clock $\phi$s is set so that only the signal level is extracted within the image signal Y0(t). Therefore, the image signal Y1(t), in which only the signal levels corresponding to the information charge amounts stored in output section 1$d$ follow in succession, can be obtained.

A divider circuit 5 divides the reset clock $\phi$r and sampling clock $\phi$s as necessary so that information charges for multiple pixels can be mixed at the output section 1*d* by setting the reset operation of the output section 1*d* to be intermittent. As shown in FIG. 3, the divider circuit 5 may be composed, for example, so as to divide by two the reset clock φr and sampling clock φs that are generated in the same period as the horizontal clock φh, and supply a reset clock φr 0 and a sampling clock φs0, which have twice the period of the horizontal clock φh, to the output section 1*d* and the sample-and-hold circuit 4. Due to the reset clock φr1 having a doubled period, the resetting of information charges every time the information charges for two pixels accumulate in the image pickup portion 1*i* results in the output of the image signal Y0(t), in which levels are changed in two steps at a timing following the horizontal clock φh, from the output section 1*d*.

The period in which the image pickup portion 1*i* of the image sensor 1 accumulates the information charges for a single image plane has a maximum length of one vertical scanning period. If the image of a dark object is captured by the sensor 1, a sufficient amount of information charges may not be obtainable, even when the accumulation period is set to the maximum length. If a sufficient amount of information charges is not obtained in the pixels of the image pickup portion 1*i*, the S/N ratio is susceptible to degradation during the process of conversion from charge amounts to voltage values at the output section 1*d*. In this sort of instance, the divider circuit 5 is operated to decrease the frequency of the reset operation of information charges at the output section 1*d* by ½ (or ⅓ or less) so that the information charges for two pixels (or for three or more pixels) are discharged together from the capacitance. Therefore, the conversion from charge amounts to voltage values is performed in a state where a sufficient amount of information charges is stored in the capacitance so that degradation of the S/N ratio can be prevented at the output section 1*d* of the image sensor 1.

If the information charges from a plurality of pixels are summed and extracted at the output section 1*d* of the image sensor 1, the amount of information extracted from the image sensor 1 decreases according to the number of pixels that are summed. For example, if information charges for two pixels are summed and the output is extracted in the output section 1*d* of the image sensor 1, the information amount of each line forming the object image decreases by one half. Therefore, degradation of picture quality of the reproduced image is inevitable.

Another problem accompanying the summing and outputting of information charges is introduced with the use of color filters. When performing color image capture with the image pickup apparatus, a color filter in which each pixel corresponds to a predetermined color component is commonly attached to the image pickup portion 1*i* of the image sensor 1. In this color filter, three primary color components or their complement color components are assigned systematically in a predetermined order to segments corresponding to each pixel. For example, in a mosaic filter, white (W) and green (G) are alternately assigned to odd-numbered line segments and cyan (Cy) and yellow (Ye) are alternately assigned to even-numbered line segments.

If the above-mentioned color filter is attached to the image pickup portion 1*i* of the image sensor 1, two adjacent pixels in the horizontal direction are assigned to different color components so that the information charges that accumulate in the adjacent pixels represent different colors. Thus, when the information charges of the two pixels are summed at the output section to yield image signal Y0(t), different color components mix so that is often impossible to correctly reproduce the desired color components in subsequent signal processing operations. For example, if W and G are mixed in the odd-numbered lines and Cy and Ye are mixed in the even-numbered lines, the result is W+G=Cy+Ye=R+2G+B (W=R+G+B, Cy=G+B, Ye=R+G), and the color information included in the image signal Y0(t) is of one type. Therefore, even when the pixels of the image pickup portion 1*i* have been made to correspond respectively to specific color components, the information corresponding to the color components cannot be reproduced from the image signal Y0(t).

SUMMARY OF THE INVENTION

It is an object of the present invention to efficiently read the information charges from the image sensor without lowering the resolution of the reproduced image even when the brightness of the object is insufficient, as well as to sum and extract the information charges of a plurality of pixels even for image sensors to which a color filter has been attached.

In one form, the present invention comprises an image sensor, in which a plurality of pixels arranged in the form of a matrix connect in every column to a plurality of vertical transfer sections and outputs of the plurality of vertical transfer sections connect to respective bits of a horizontal transfer section, for converting an output charge amount of the horizontal transfer section into a voltage value to be output at an output section; a drive circuit for transferring information charges that are generated at the plurality of pixels to the plurality of vertical transfer sections, then from the plurality of vertical transfer sections to the horizontal transfer section for every horizontal line, and further from the horizontal transfer section to the output section, and for discharging the information charges that accumulate in the output section in synchronization with the transfer operation of the horizontal transfer section; and a detector circuit for extracting in synchronization with the discharge operation of the drive circuit the voltage value that is output from the output section.

The drive circuit sets a period for the discharge operation of the output section to an integral multiple of the period of the transfer operation of the horizontal transfer section to accumulate in the output section the information charges for a plurality of pixels, and the detector circuit extracts in step fashion a change in potential during the process where information charges of a plurality of pixels sequentially accumulate at the output section in synchronization with the transfer operation of the horizontal transfer section.

According to another aspect the present invention, in the process where the information charges of a plurality of pixels accumulate in a step fashion in the output section of the image sensor, the output voltages at the steps are respectively extracted so that the voltage values corresponding to the information charge amounts of the various pixels can be obtained from the differences in output voltages of each step. Therefore, the output voltage values equivalent to the total of the information charges of the plurality of pixels can be obtained at the output section of the image sensor, and at the same time the information corresponding to the individual pixels can be obtained. Furthermore, even if different color components are mixed at the output step of the image sensor, these color components can easily be separated through signal processing operations.

Furthermore, in the present invention, when each pixel of the image sensor is mapped to the same color component for every other column, the drive circuit alternately transfers information charges to the horizontal transfer section with the odd-numbered columns and even-numbered columns of the vertical transfer section.

Therefore, in the present invention, when each pixel of the image sensor is mapped to the same color component for every other line, performing transfers for every other line from the vertical transfer section to the horizontal transfer section results in information charges that are mapped to the same color component being transferred simultaneously. Information charges for multiple pixels mapped to the same color component accumulate at the output side of the horizontal transfer section, and the voltage values corresponding to the information charge amounts are output. Simultaneously, the output voltage values at each step in the process where the information charges of multiple pixels accumulate in sequence are extracted. The information charges of multiple pixels are summed without mixing the different color components, and at the same time the summed output of multiple pixels and the individual output of each pixel can be respectively extracted.

DETAILED DESCRIPTION OF THE PREFERRED EMBODIMENTS

First Embodiment

Figure 4:
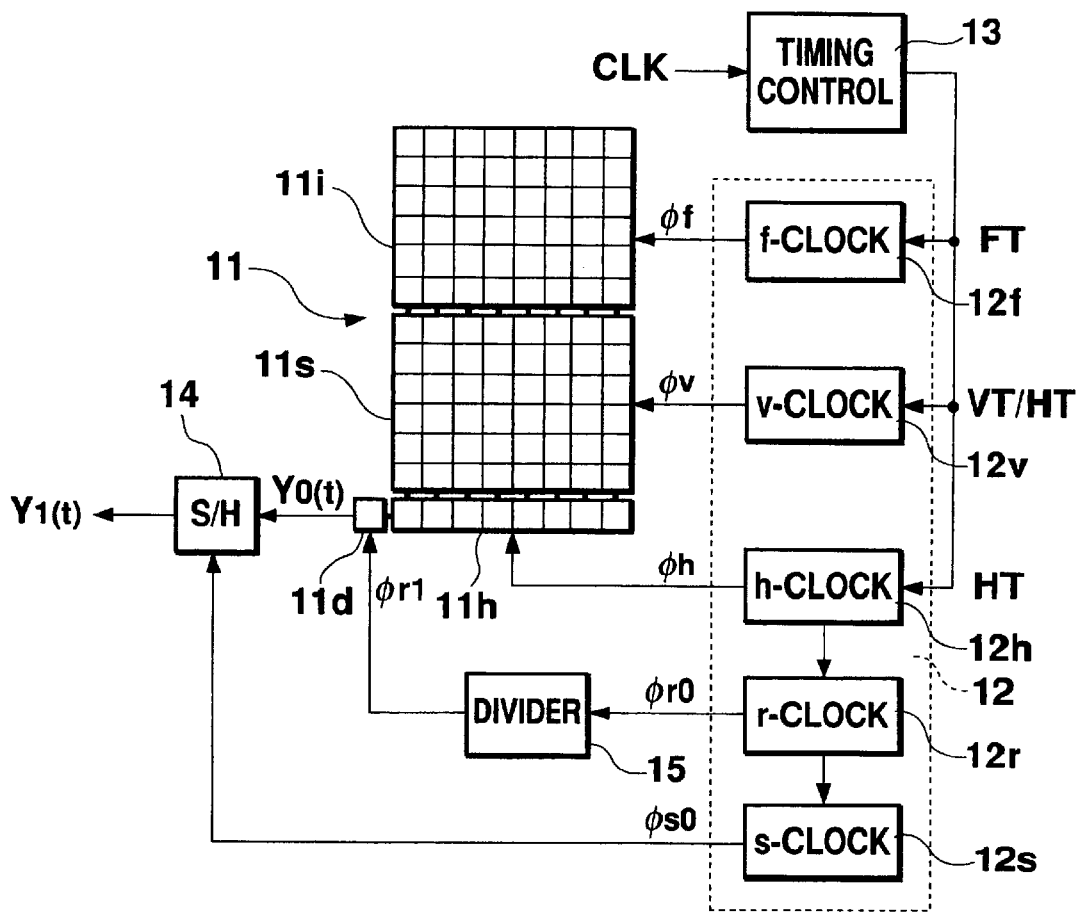
FIG. 4 is a block diagram showing the structure of a solid-state image pickup apparatus pertaining to a first embodiment of the present invention.
Figure 5:
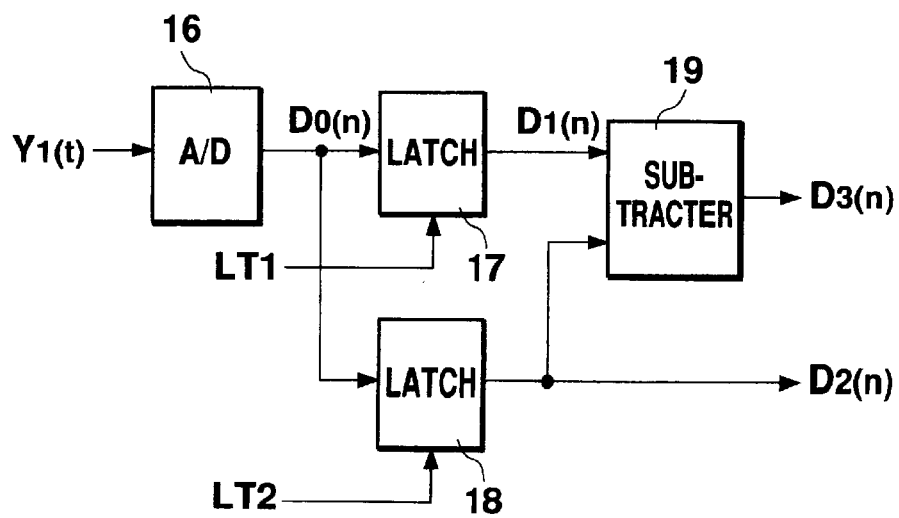
FIG. 5 is a block diagram showing the structure of a signal processing circuit for a picture signal used in the solid-state image pickup apparatus shown in FIG. 4.
Figure 6:
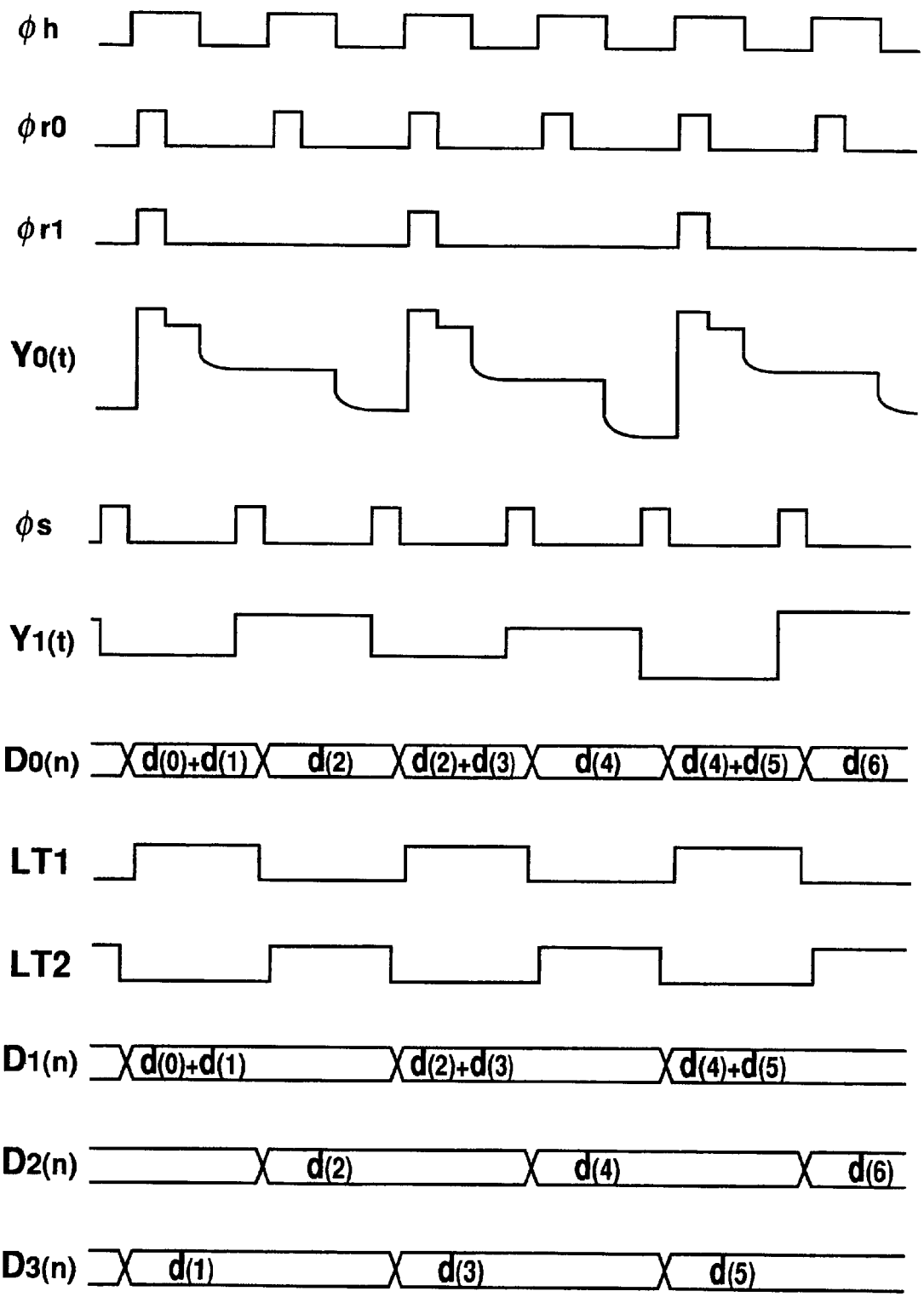
FIG. 6 is a timing chart illustrating operations of FIGS. 4 and 5.

FIG. 4 is a block diagram showing the configuration of a solid-state image pickup apparatus according to a first embodiment of the present invention. FIG. 5 is a block diagram showing the configuration of a signal processing circuit for an image signal that is obtained from the solid-state image pickup apparatus of FIG. 4. FIG. 6 is a timing chart illustrating the operation of FIGS. 4 and 5. These figures illustrate a case where information charges are summed two pixels at a time at an output section 11d of an image sensor 11.

The solid-state image pickup apparatus (FIG. 4) comprises the frame-transfer-type CCD image sensor 11, a drive circuit 12 for driving the image sensor 11, and a timing control circuit 13 for controlling the operation timing of the drive circuit 12. Furthermore, the solid-state image pickup apparatus includes a sample-and-hold circuit 14, which serves as a detector circuit for receiving an output of the image sensor 11, and a divider circuit 15 for dividing reset clock φr0 that is supplied to the image sensor 11 from the drive circuit 12.

Figure 1:
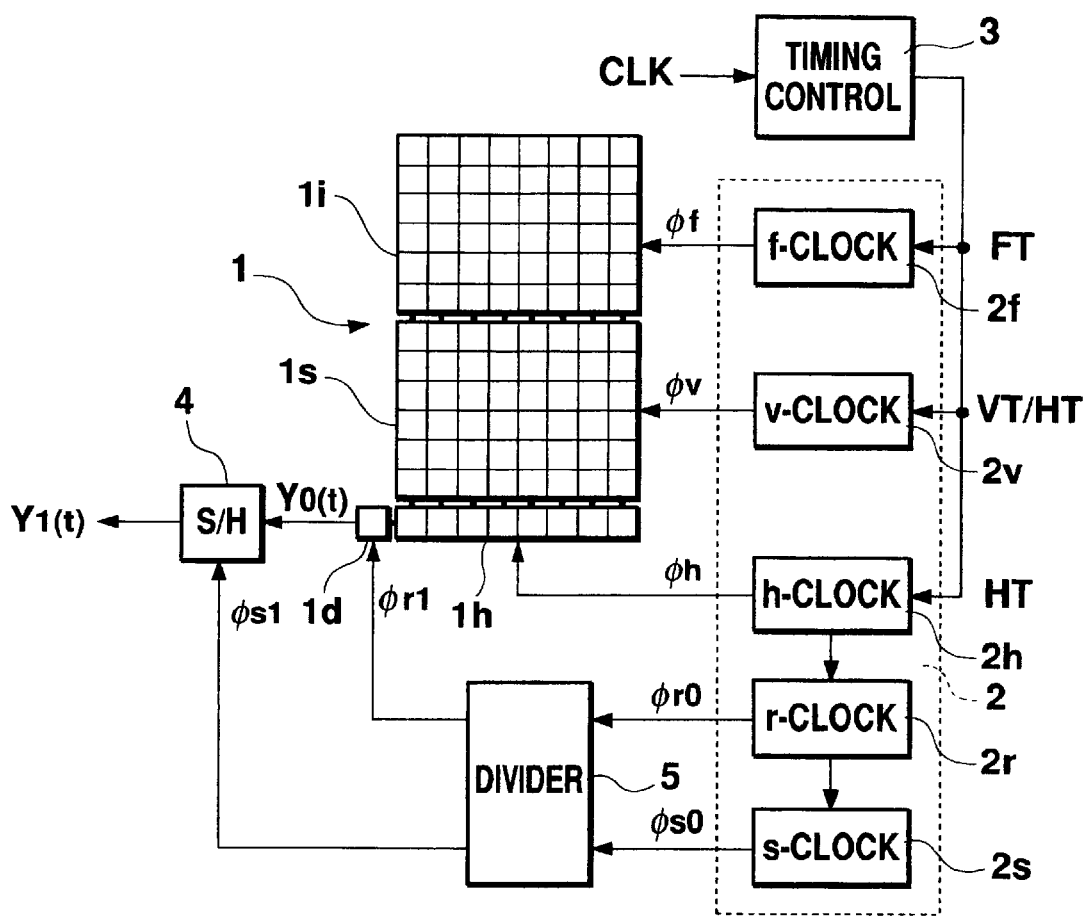
FIG. 1 is a block diagram showing the structure of a conventional solid-state image pickup apparatus.
Figure 2:
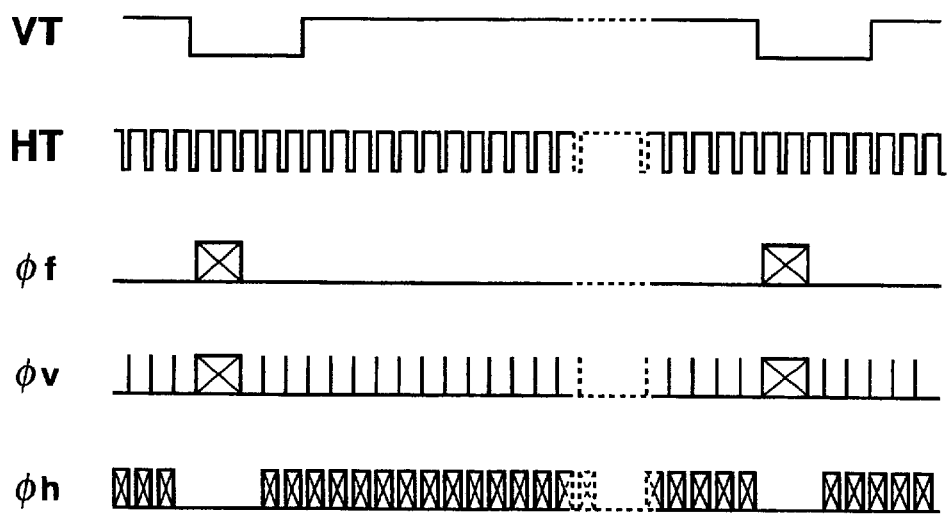
FIG. 2 is a timing chart illustrating a first operation of a conventional solid-state image pickup apparatus.
Figure 3:
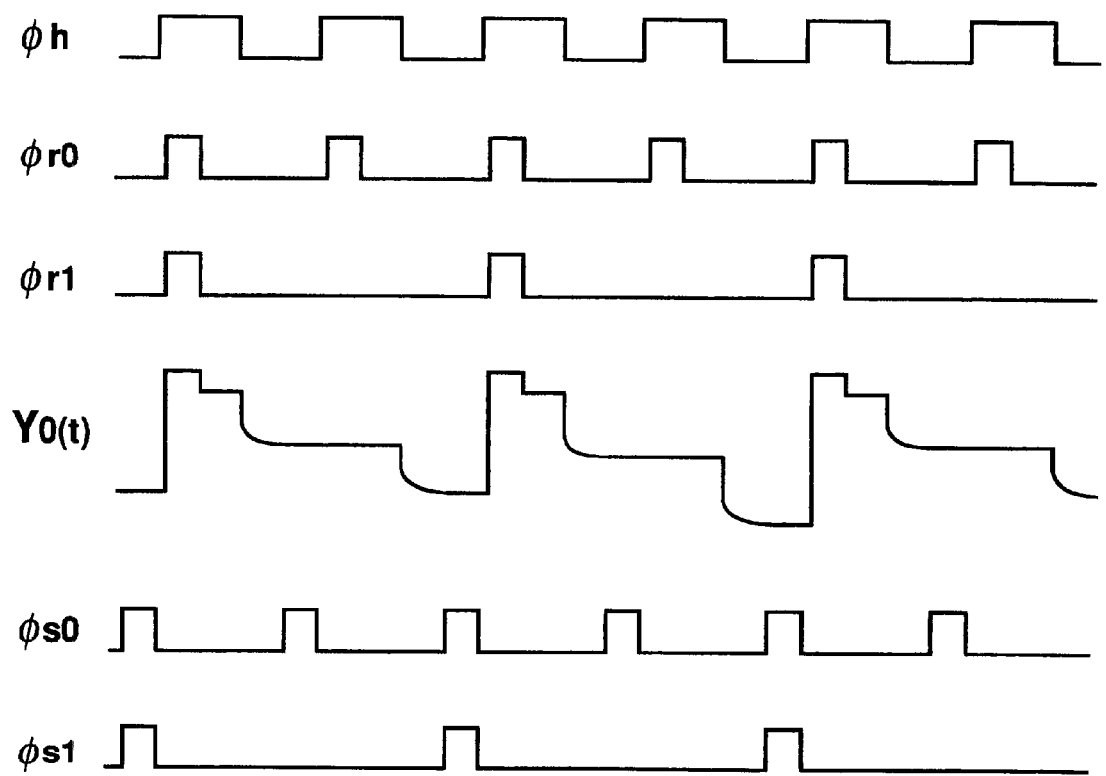
FIG. 3 is a timing chart illustrating a second operation of a conventional solid-state image pickup apparatus.

The image sensor 11 comprises an image pickup portion 11i, a storage portion 11s, a horizontal transfer section 11h, and the output section 11d. The portions 11i, 11s, 11h, and 11d of the image sensor 11 have structures which correspond to respective portions of the image sensor 1 (image pickup portion 1i, storage portion 1s, horizontal transfer section 1h, output section 1d) shown in FIG. 1 so their descriptions will not be repeated.

Drive circuit 12 comprises a frame clock generator portion 12f, a vertical clock generator portion 12v, a horizontal clock generator portion 12h, a reset clock generator portion 12r, and a sampling clock generator portion 12s. The frame clock generator portion 12f, the vertical clock generator portion 12v, and the horizontal clock generator portion 12h at the drive circuit 12 have structures which correspond to respective portions of the drive circuit 2 (frame clock generator portion 2f, vertical clock generator portion 2v, horizontal clock generator portion 2h) shown in FIG. 1.

The reset clock generator portion 12r synchronizes with the operation of the horizontal clock generator portion 12h, generates the reset clock φr0 for discharging in sequence the information charges of the output section 11d at the same period with horizontal clock φh, and supplies this clock to the divider circuit 15, which is mentioned later. The sampling clock generator portion 12s, similar to the reset clock generator portion 12r, generates in synchronization with the operation of the horizontal clock generator portion 12h the sampling clock φs0 for sampling in sequence the image signal Y0(t) that is output from the output section 11d, and supplies this clock to the sample-and-hold circuit 14, which will be described below.

The timing control circuit 13 generates the vertical synchronization signal VT and the horizontal synchronization signal HT for determining the respective timings of the vertical scan and horizontal scan. The timing control circuit 13 generates the frame transfer timing signal FT at a period coinciding with the vertical synchronization signal VT for supply to the drive circuit 12 together with the vertical synchronization signal VT and the horizontal synchronization signal HT. The timing control circuit 13, similar to the timing control circuit 3 shown in FIG. 1, performs shutter control to control the expansion and contraction of the accumulation time of information charges in the image sensor.

The sample-and-hold circuit 14 samples the image signal Y0(t) output from the image sensor 11 in response to the sampling clock φs0 that is supplied from the sampling clock generator portion 12s. Normally, since charging and discharging of the capacitance at the output section 11d repeat at a timing that follows the reset clock φr1, the reset level and the signal level, which corresponds to the information charge amount, alternately repeat in succession in the image signal Y0(t) obtained from the output section 11d, as shown in FIG. 6. The phase of the sampling clock φr is set so that only the signal level in the image signal Y0(t) is extracted. Therefore, the image signal Y1(t) can be obtained in which only the signal levels corresponding to the information charge amounts that accumulate in the output section 11d follow in succession.

The divider circuit 15 divides by two the reset clock φr0 generated at the same frequency as the horizontal clock φh, and generates the divided reset clock φr1 for supply to the output section 11d. This causes the reset operation at the output section 11d to become intermittent so that the information charges for two pixels can be combined. Therefore, as shown in FIG. 6, the image signal Y0(t) output from the output section 11d has a signal level varying in two steps at the timing of the horizontal clock φh after the reset level. Since the sample-and-hold circuit 14 operates at the same period as the horizontal clock φh, the signal levels for the image signal Y0(t), which vary in two steps, are sampled. As a result, the sample-and-hold circuit 14 outputs the image signal Y1(t) in which the signal level corresponding to the information charge of a single pixel and the signal level corresponding to the information charge of two pixels alternately repeat.

The signal processing circuit (FIG. 5) comprises an A/D converter circuit 16, a first latch circuit 17, a second latch circuit 18, and a subtracter circuit 19, and performs processing to calculate the information charges before summing at the output section 11d based on the image signal Y1(t) that is output from the sample-and-hold circuit 14.

The A/D converter circuit 16 inputs, in synchronization with the sample-and-hold circuit 14, the image signal Y1(t) and generates image data D0(n) corresponding to each pixel of the image sensor 11. In the image data D0(n), data corresponding to the information charge for single pixels and data corresponding to the information charge of two pixels repeat as shown in FIG. 6. For example, when a 2m−1 (odd) numbered pixel is read by itself, image data D0(2m−1) is data d(2m−1) representing the information charge amount y(2m−1) of the 2m−1 numbered pixel. Then, when a 2m (even) numbered pixel is combined with the previous pixel and read, image data D0(2m) is data d(2m−1)+d(2m) representing the information charge amount y(2m−1)+y(2m) in which the information charge amount y(2m−1) of the 2m−1 numbered pixel is added to the information charge amount y(2m) of the 2m numbered pixel.

The first latch 17 responds to a first latch pulse LT1, latches every other data item in the image data D0(n) at the timing where the information charges for two pixels are output, and outputs the image data D1(n) in which data d(2m−1)+d(2m) representing the information charges for two pixels are in succession. The second latch 18 responds to a second latch pulse LT2, latches every other data item in the image data D0(n) at the timing where the information charge for a single pixel is output by itself, and outputs the image data D2(n) in which data d(2m) representing the information charge for single pixels are in succession. As shown in FIG. 6, data d(2m−1)+d(2m) and data d(2m−1) in image data D1(n) and image data D2(n) follow in succession in two clock units. However, the timings for image data D1(n) and image data D2(n) are shifted from each other by one clock period.

The subtracter circuit 19 subtracts the image data D2(n) that is output from the second latch circuit 18 from the image data D1(n) that is output from the first latch circuit 17 to generate image data D3(n). In this subtraction process, the image data D2(n) representing the information charge of single pixels is subtracted from the image data D1(n) representing the information charge of two pixels so that the information charge amount before the information charges were summed is calculated. The subtracter circuit 19 performs subtraction during the period where information for two pixels is input (operating period of first latch circuit 17) in the image data D0(n), and stores and outputs the previous subtraction result during the period where information for single pixels is input (operating period of second latch circuit 18) in the image data D0(n).

The image data D2(n) and D3(n) that are output in this manner are alternately input by a chrominance signal processing circuitry, such as, for example, for white balance adjustment and balanced modulation, and by a luminance signal processing circuitry, such as for two-dimensional filter processing and outline correction. During the period where data d(2m−1) representing the information charge amount for single pixels is input, the image data D2(n) from the second latch circuit 18 is selected, and during the period where data d(2m−1)+d(2m) representing the charge amount for two pixels is input, the image data D3(n) from the subtracter circuit 19 is selected. As a result, information of all individual pixels of the image pickup portion 11i can be obtained even while the summing of information charges of two pixels at the output section 11d of the image sensor 11 is being performed.

Figure 7:
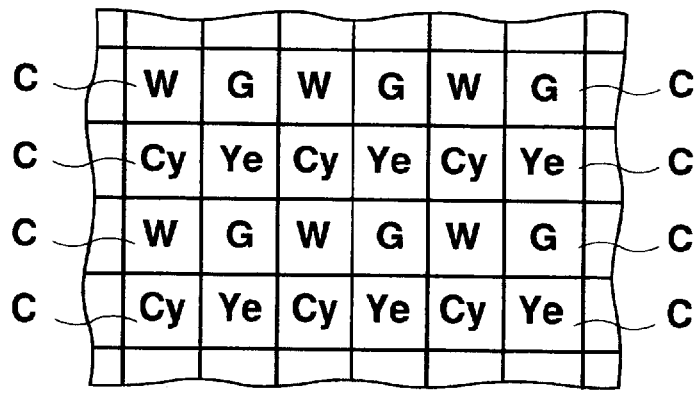
FIG. 7 is a top view showing the structure of a mosaic-type color filter.
Figure 8:
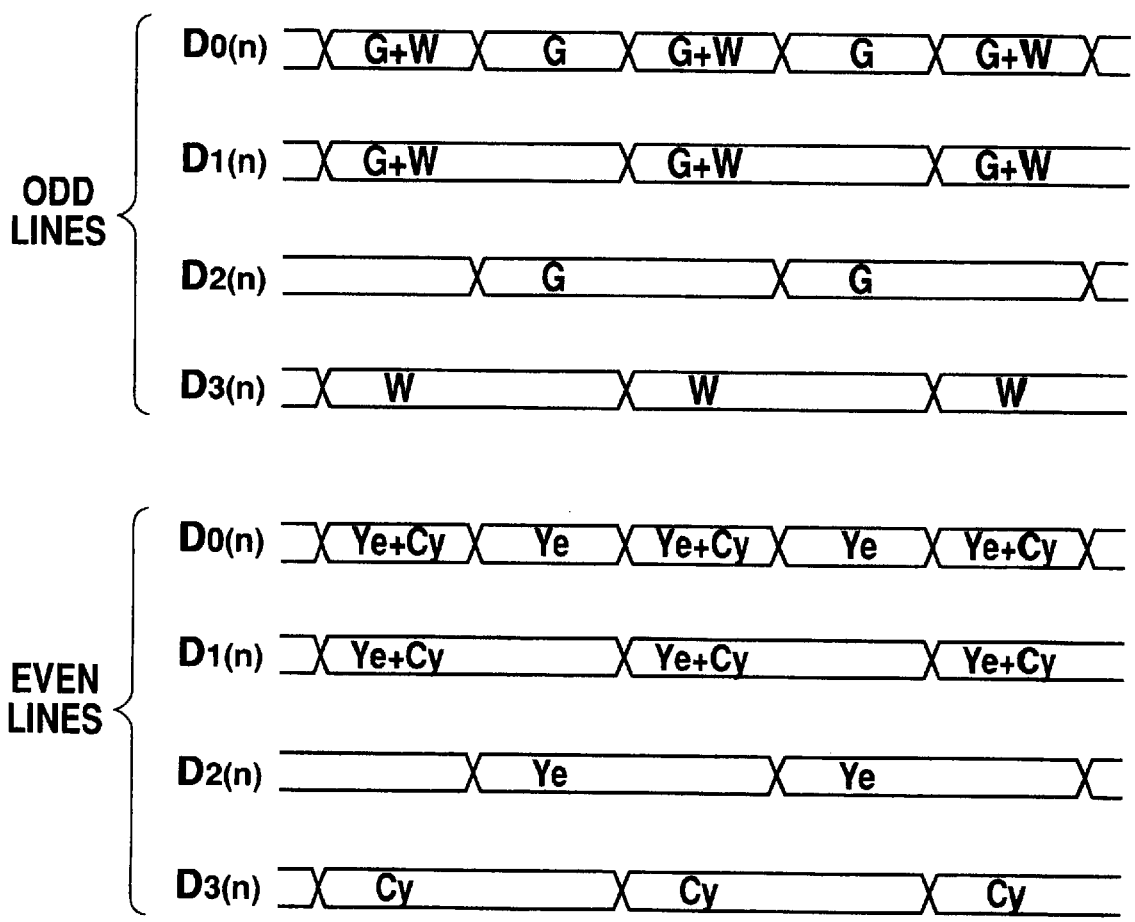
FIG. 8 is a timing chart showing the arrangement of color components of picture data corresponding to the image sensor to which the mosaic-type color filter is mounted.

In the above-mentioned solid-state image pickup apparatus, all color components can be extracted individually, even with a mosaic-type color filter attached to the image pickup portion 11i of the image sensor 11. For example, as shown in FIG. 7, for a mosaic-type color filter where the four color components of white (W), green (G), yellow (Ye), and cyan (Cy) are mapped to a plurality of segments C, which are divided so as to correspond to all the pixels of the image pickup portion 11i, image data D0(n) to D3(n) shown in FIG. 8 are obtained. Namely, when G and W are mapped at the odd lines and Ye and Cy are mapped at the even lines for the pixels of the image pickup portion 11i, components G and G+W repeat in the image data D0(n) corresponding to the odd-lined pixels, and components Ye and Ye+Cy repeat in the image data D0(n) corresponding to the even-lined pixels. Corresponding to image data D0(n), G+W components are in succession in the odd lines and Ye+Cy components are in succession in the even lines in image data D1(n), which is output from the first latch circuit 17. For the image data D0(n) output from the second latch circuit 18, G components are in succession in the odd lines and Ye components are in succession in the even lines. For the image data D3(n) output from the subtracter circuit 19, W components are in succession in the odd lines and Cy components are in succession in the even lines. Therefore, even if two types of color components are mixed at the output section 11d of the image sensor 11, all color components can be reproduced in the signal processing step.

Second Embodiment

Figure 9:
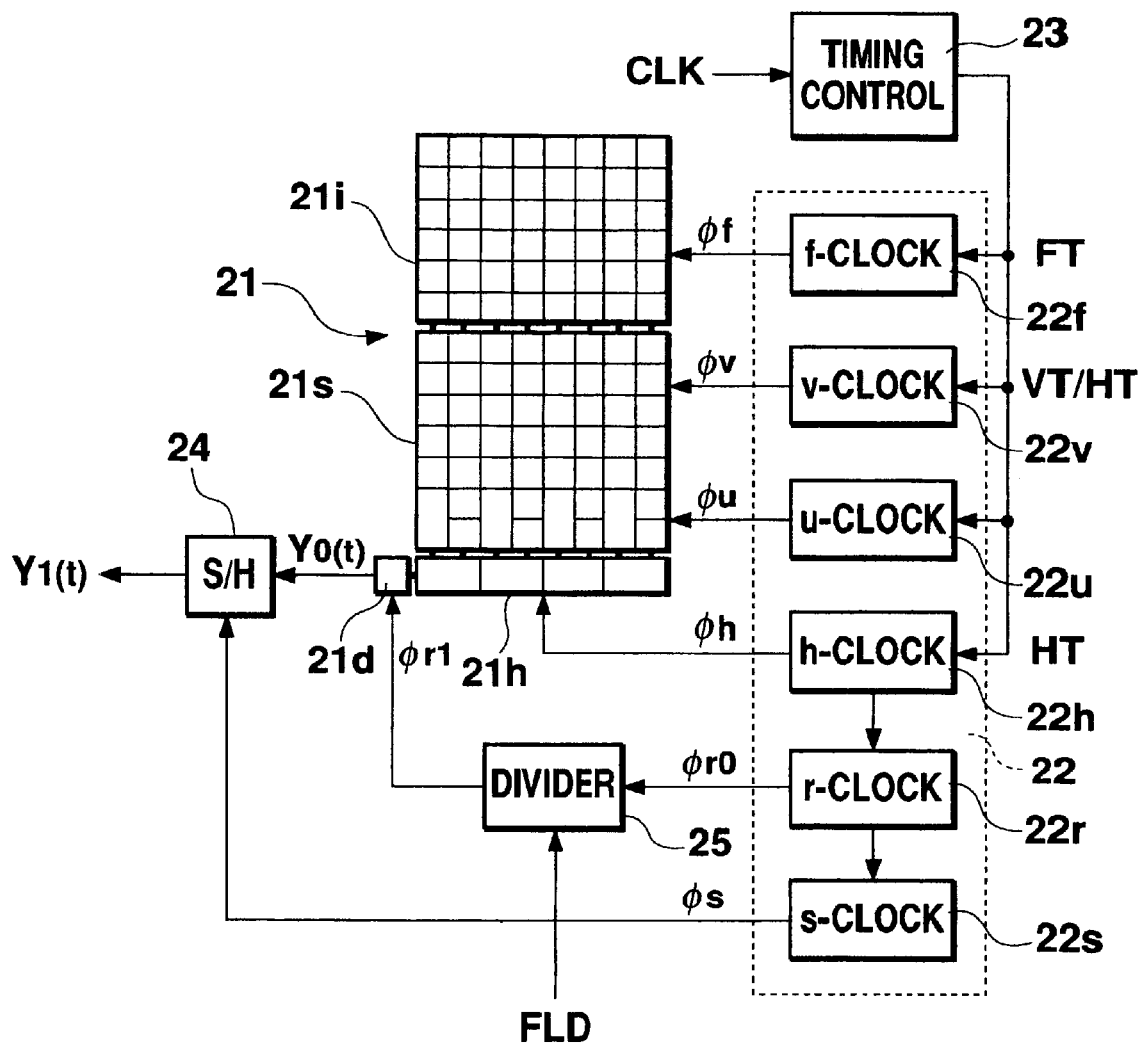
FIG. 9 is a block diagram showing the structure of a solid-state image pickup apparatus pertaining to a second embodiment of the present invention.

FIG. 9 is a block diagram showing the configuration of a solid-state image pickup apparatus according to a second embodiment of the present invention.

Figure 10:
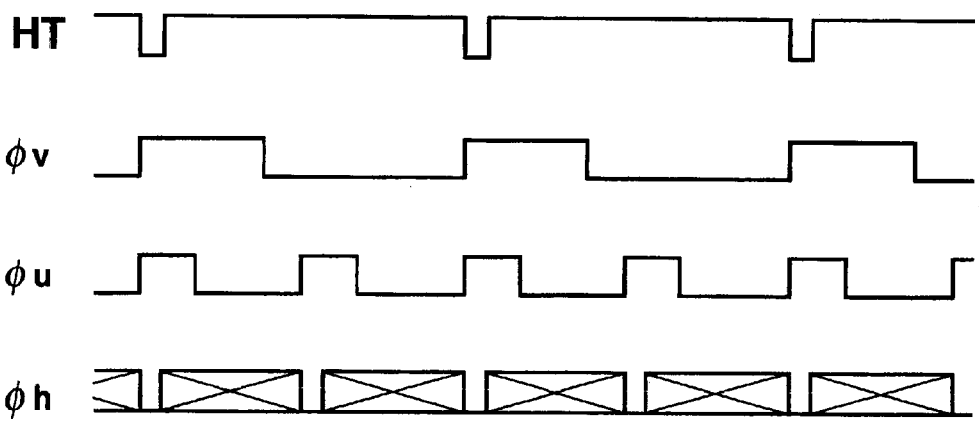
FIG. 10 is a timing chart illustrating a first operation of the solid-state image pickup apparatus shown in FIG. 9.
Figure 11:
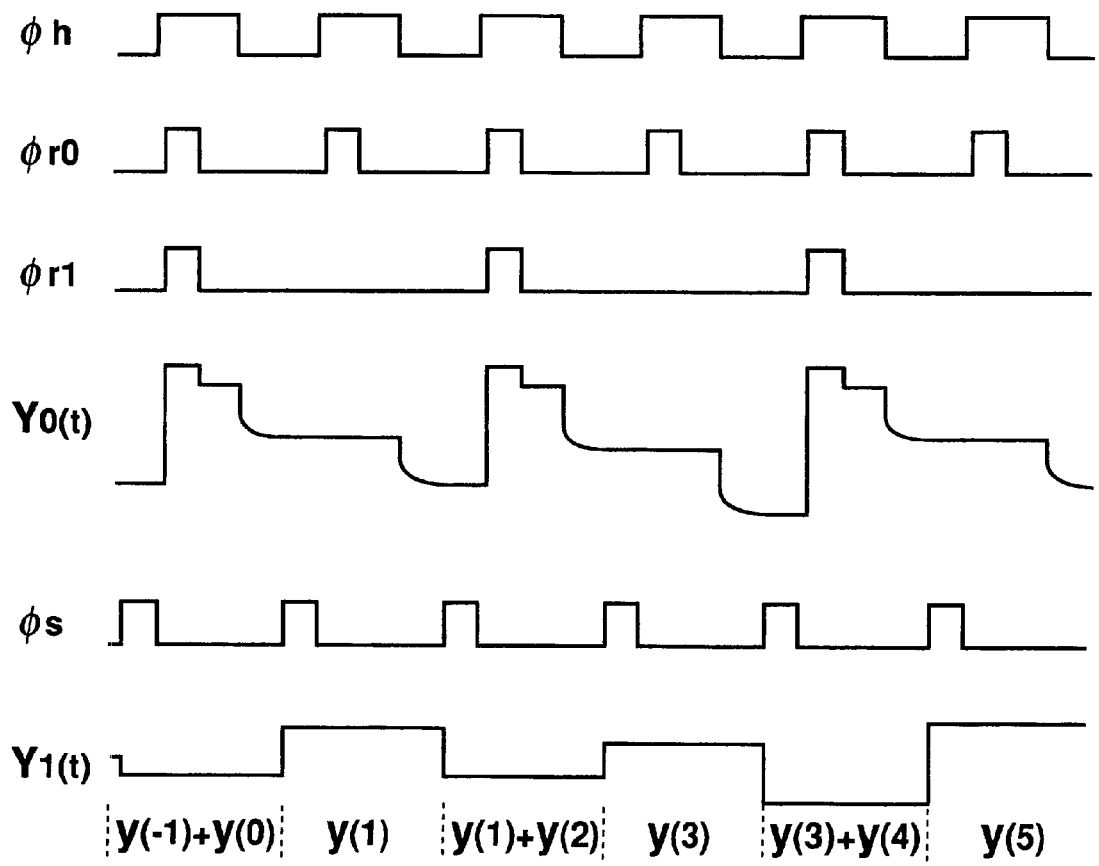
FIG. 11 is a timing chart illustrating a second operation of the solid-state image pickup apparatus shown in FIG. 9.

FIGS. 10 and 11 are timing charts illustrating the operation of an image sensor 21 shown in FIG. 9. FIG. 10 shows the operation of the horizontal scan period, while FIG. 11 shows the operation of the horizontal clock period. These timing charts illustrate a case where the information charges of two pixels are summed and read at an output section 21d of the image sensor 21. Although in reality the vertical clock φv and auxiliary clock φu have four phases and the horizontal clock φh has two phases, only the representative clocks are shown in the timing charts.

The solid-state image pickup apparatus (FIG. 9) comprises the image sensor 21, a drive circuit 22, a timing control circuit 23, a sample-and-hold circuit 24, and a divider circuit 25. Among these, the timing control circuit 23 and the sample-and-hold circuit 24 are identical to those in the solid-state image pickup device of FIG. 4 (timing control circuit 13 and sample-and-hold circuit 14) so their descriptions will be omitted.

The frame transfer type CCD image sensor 21 comprises an image pickup portion 21i, a storage portion 21s, a horizontal transfer section 21h, and the output section 21d. The image pickup portion 21i is formed from a plurality of CCD shift. registers in which a plurality of bits are arranged in a vertical direction parallel to one another. Respective bits of the shift registers form pixels and accumulate information charges that are generated during the image pickup period. The storage portion 21s is formed from a plurality of CCD shift registers provided in respective succession to and have the same number of bits as the shift registers of the image pickup portion 21i, and to each bit of the shift registers is temporarily stored the information charge that is transferred out from the respective pixel of the image pickup portion 21i. The even-numbered columns of the shift registers of the storage portion 21s have additional single bits on the side connecting to the horizontal transfer section 21h, which are not found in the odd-numbered columns of the shift registers. The horizontal transfer section 21h is formed from a single CCD shift register in which each bit is connected to the output of each shift register of the storage portion 21s, and information charges that are transferred out from the storage portion 21s are sequentially transferred to the output section 21d. Each bit of the shift register of the horizontal transfer section 21h is mapped to two columns of the respective shift registers of the image pickup portion 21i and the storage portion 21s. The output section 21d is provided at the output side of the horizontal transfer section 21h and has capacitance to receive information charges. The output section 21d accepts information charges that are transferred out from the horizontal transfer section 21h and outputs voltage values according to the charge amounts.

The mosaic-type color filter shown in FIG. 7 is attached to the image pickup portion 21i of the image sensor 21. The color filter is divided into a plurality of segments C so as to correspond to the pixels of the image pickup portion 21i, where each segment C is mapped to a predetermined color component. For example, when four color components of white (W), green (G), yellow (Ye), and cyan (Cy) are used, W and G are mapped alternately to odd-numbered line segments C, and Ye and Cy are mapped alternately to even-numbered line segments C. Therefore, information charges corresponding to the W component and information charges corresponding to the G component for every column alternately accumulate in the odd-numbered lines of the pixels, and information charges corresponding to the Y component and information charges corresponding to the Cy component for every column alternately accumulate in the even-numbered lines of the pixels.

The drive circuit 22 comprises a frame clock generator portion 22f, a vertical clock generator portion 22v, an auxiliary clock generator portion 22u, a horizontal clock generator 22h, a reset clock generator portion 22r, and a sampling clock generator portion 22s. The frame clock generator portion 22f generates the frame clock φf in response to the frame shift timing signal FT of the vertical scanning period for supply to the image pickup portion 21i. As a result, the information charges that have accumulated in the pixels of the image pickup portion 21i are transferred at a high speed to the storage portion 21s at every vertical scanning period. The frame clock generator portion 22f corresponds to the drive circuit 12 of FIG. 4. The vertical clock generator portion 22v generates the vertical clock φv in response to the vertical synchronization signal VT and the horizontal synchronization signal HT for supply to the storage portion 21s. The auxiliary clock generator portion 22u responds to the horizontal synchronization signal HT and generates the auxiliary clock φu having a period which is one half the vertical clock φv for supply only to the extra bits provided at the output end of even-numbered columns of the shift registers of the storage portion 21s. As a result, the information charges that are output from the image pickup portion 21i are input and temporarily stored in the storage portion 21s, then transferred alternately in odd and even columns (namely, ½ line at a time) to the horizontal transfer section 21h at every period which is one half the horizontal scanning period.

The horizontal clock generator portion 22h generates the horizontal transfer clock φh in response to the horizontal synchronization signal HT for supply to the horizontal transfer section 21h. As the horizontal transfer section 21h comprises a shift register having a number of bits equal to ½ the number of columns in the image pickup portion 21i, all the information charges that were input by the horizontal transfer section 21h are transferred out to the output section 21d in one half the horizontal scanning period. This transferring out of information charge packets, having half the number of horizontal pixels, is repeated twice during one horizontal scanning period to complete the transferring out of information charges for one line.

The reset clock generator portion 22r generates, in synchronization with the operation of the horizontal clock generator portion 22h, a reset clock φr for supply to the output section 21d for sequentially discharging the information charges of the output section 21d. Then, the sampling clock generator portion 22s, similar to the reset clock generator portion 22r, generates, in synchronization with the operation of the horizontal clock generator portion 22h, a sampling clock φs for supply to the sample-and-hold circuit 24 to be described later for sequentially sampling the image signal Y0(t) that is output from the output section 21d.

The divider circuit 25 divides the reset clock φr by a predetermined proportion for supply to the output section 21d. This causes the reset operation at the output section 21d to become intermittent so that information charges for a plurality of pixels are combined at the output section 21d. For example, the divider is composed so that the reset clock φr0 generated at the same frequency as the horizontal clock φh is divided by two, and the reset clock φr1, with twice the period of the horizontal clock φh, is supplied to the output section 21d. The divider circuit 25 shifts by one clock period the timing of the division operation at each vertical scanning period in accordance with the frame identification signal FLD, which inverts at every vertical scanning period. As a result, the combination of pixels that are added to each other at the output section 21d is shifted by one pixel at each vertical scanning period to realize a simulated interlaced scanning, thereby suppressing the degradation of the resolution due to pixel combining.

By setting the output operation of the output section to be intermittent, and at the same time operating the sample-andhold circuit 24 in accordance with the transfer operation of the horizontal transfer section 21h, the image signal Y1(t) can be obtained to include information charges corresponding to the information charge amount of every pixel and information charges corresponding to the information charge amount which is a summation of a plurality of pixels. For example, when the information charges for two pixels are summed and output, the image signal Y1(t) alternately repeats the period of the voltage value corresponding to the information charge amount for one pixel and the period of the voltage value corresponding to the information charge amount for two pixels. Therefore, in the signal processing for the image signal Y1(t), information for when the information charge for each pixel is read individually and for when a plurality of pixels are combined and read can be selectively handled as necessary.

Figure 12:
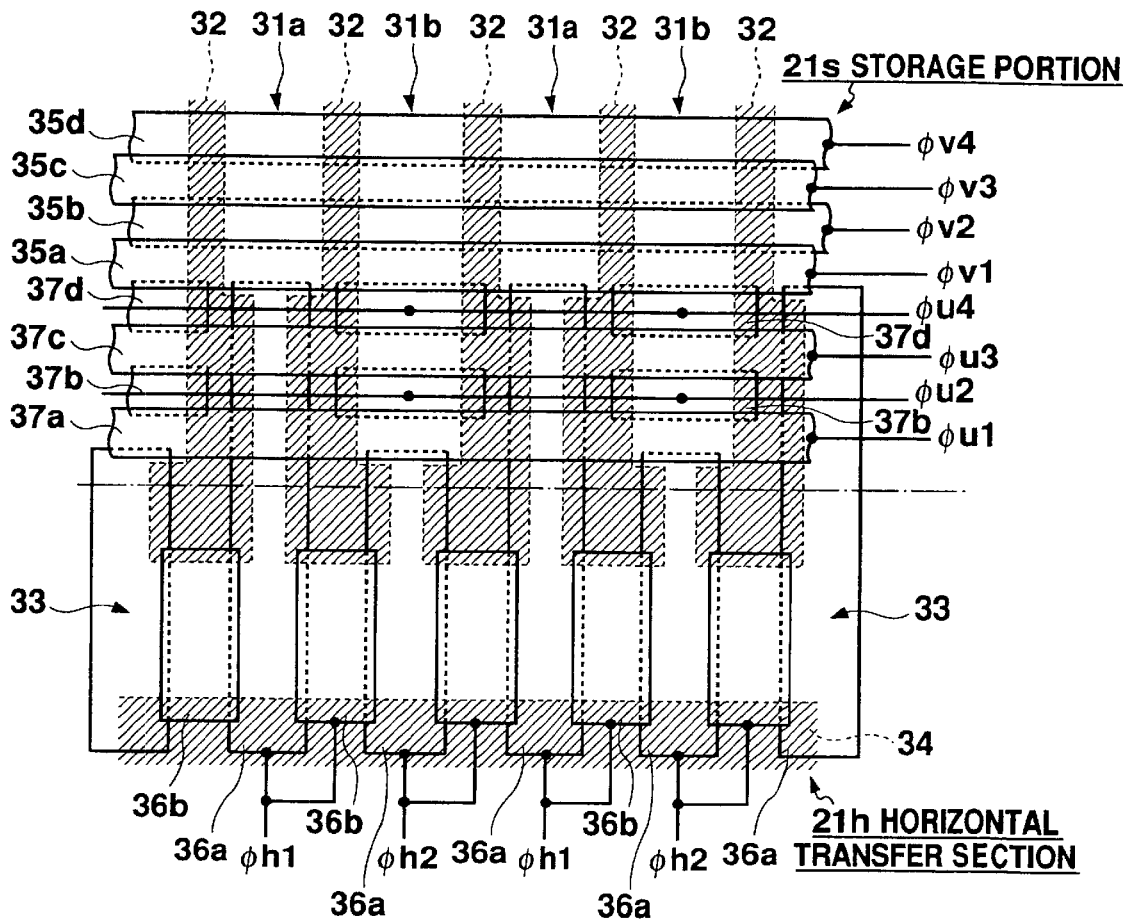
FIG. 12 is a top view of one example of the structure of the connecting portion between the storage portion and horizontal transfer section of the image sensor used in the solid-state image pickup apparatus shown in FIG. 9.

FIG. 12 is a top view showing an example composition of a connection between the storage portion 21s and the horizontal transfer section 21h of the image sensor shown in FIG. 9.

A plurality of vertical transfer channels 31a, 31b are partitioned by isolation areas 32 and extend in parallel to one another along the vertical direction (transfer direction). At the output ends of the vertical transfer channels 31a, 31b, a horizontal transfer channel 33, which continues from the vertical transfer channels 31a, 31b, is partitioned by an isolation area 34 and extends along the horizontal direction. On each bit of the plurality of vertical transfer channels 31a, 31b, a plurality of parallel transfer electrodes 35a to 35d extend along the horizontal direction so as to be in common with each column, and are arranged in an insulated condition alternately on a top layer and bottom layer (two layer construction). Four-phase vertical clocks ϕv1 to ϕv4 are supplied to the transfer electrodes 35a to 35d. On the horizontal transfer channel 33, a plurality of transfer electrodes 36a, 36b form a two-layer construction and are arranged so as to extend along the vertical direction. Two adjacent transfer electrodes 36a, 36b are connected together, and two-phase horizontal clocks ϕh1, ϕh2 are impressed alternately to each pair in the order of the pairs. The lower layer transfer electrodes 36a extend to the vertical transfer channels 31a, 31b so as to cover the connecting portions of the vertical transfer channels 31a, 31b and the horizontal transfer channel 33. At the connecting portions of the odd-numbered column vertical transfer channels 31a and the horizontal transfer channel 33, an area is provided to align with the even-numbered columns of shift registers forming channel lengths of an additional bit. Transfer electrodes 36a cover this area.

Auxiliary transfer electrodes 37a to 37d are formed using a two-layer construction at the output sides of the vertical transfer channels 31a, 31b (on the side of the horizontal transfer channel 33). The auxiliary transfer electrodes 37b, 37d of the lower layer are provided only on the odd-numbered column vertical transfer channels 31b. The auxiliary transfer electrodes 37a, 37c are arranged across all the vertical transfer channels 31a, 31b. However, since auxiliary transfer electrodes 37a, 37c overlap the transfer electrode 36a on the odd-numbered column vertical transfer channels 31a, they are effective only for the even-numbered column vertical transfer channels 31b. To these auxiliary transfer electrodes 37a to 37d are supplied four-phase auxiliary clocks ϕu1 to ϕu4. As a result, auxiliary transfer electrodes 37a to 37d form auxiliary single bits at the output ends of even-numbered column vertical transfer channels 31b so that in the process where the information charges transfer from the storage portion 11s to the horizontal transfer section 11h, the even-numbered column vertical transfer channels 31b can temporarily suspend the information charges for single pixels.

Vertical clock ϕv clocks the transfer electrodes 35a to 35d at a period following the horizontal synchronization signal HT, and the information charges within the vertical transfer channels 31a, 31b are transferred in one horizontal scanning period one pixel at a time in the vertical direction. The auxiliary clock ϕu has one half the period of the vertical clock ϕv and clocks the auxiliary transfer electrodes 37a to 37d at one half the period of horizontal synchronization signal HT. Since the auxiliary transfer electrodes 37a to 37d effectively operate only for the even-numbered column vertical transfer channels 31b, the information charges within the even-numbered column vertical transfer channels 31b are transferred in the vertical direction two packets at a time at the output ends in one horizontal scanning period. At this time, since only the information charge packets for single pixels are transferred in one horizontal scanning period from the transfer electrodes 35a to 35d to the auxiliary transfer electrodes 37a to 37d, every other packet is actually an empty transfer at the auxiliary transfer electrodes 37a to 37d. Therefore, the odd-numbered column vertical transfer channels 31a and the even-numbered column vertical transfer channels 31b alternately transfer the information charges for single pixels to the horizontal transfer channel 33 at a timing shifted from each other by only half the vertical scanning period.

The horizontal clock ϕh is activated to correspond to the vertical clock ϕv and the auxiliary clock ϕu, and clocks the transfer electrodes 36a, 36b at a period sufficiently shorter than the horizontal scanning period. The period of the horizontal clock ϕh is set so that the information charges within the horizontal transfer channel 33 can be completely transferred out within one half the horizontal scanning period, and so that a fixed blanking period can be secured. This period is set in order that the information charges from the odd-numbered column vertical transfer channels 31a are transferred out in the first half of each horizontal scanning period and the information charges from the even-numbered column vertical transfer channels 31b are transferred out in the second half.

As shown in FIG. 11, the reset clock ϕr0 is generated in synchronization with the horizontal clock ϕh. The reset clock ϕr0 has the same period as the horizontal transfer period and is used in the conventional reset operation for discharging information charges that accumulate in the output section 21d of the image sensor. The divided reset clock ϕr1 is generated by dividing in half the reset clock ϕr0, and at twice the horizontal transfer period, outputs the information charges that are stored in the output section 21d of the image sensor 21. The present apparatus uses ϕr1 to perform the reset operation so that the information charges for two pixels are stored simultaneously at the output section of image sensor 21 and the image signal Y0(t) that is output changes signal levels in two steps after the reset period that is specified by the divided reset clock ϕr1.

The sampling clock ϕs has the same period as the reset clock ϕr0 and a timing preceding the reset period of the reset clock ϕr0. As a result, the signal level prior to the reset timing of the image signal Y0(t) is sampled at the sample-and-hold circuit 24, and the image signal Y1(t), which maintains the signal level for one clock period (one period of horizontal clock ϕh), is generated. As the reset operation of the output section 21d is intermittent, the signal level of the image signal Y0(t) alternately repeats the voltage value corresponding to the information charge of one pixel and that corresponding to the information charges for two pixels. For example, when an odd-numbered pixel is read individually, the signal level becomes a voltage value in accordance with information charge amount y(2m−1) of the odd-numbered pixel. When an even-number pixel is added to the previous odd-numbered pixel and then read, the signal level becomes a voltage value corresponding to the charge amount y(2m−1)+y(2m), which adds to the information charge amount y(2m) of the even-numbered pixel the information charge amount y(2m−1) of the odd-numbered pixel. Therefore, in the image signal Y1(t), the period representing the information charge amount for one pixel and the period representing the information charge amount for two pixels alternately repeat.

Figure 13:
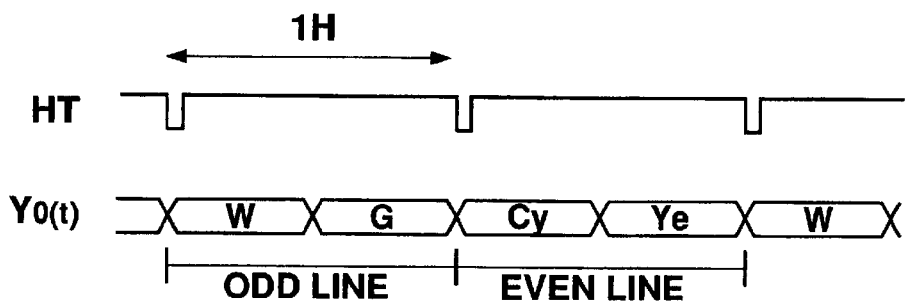
FIG. 13 is a timing chart showing the arrangement of color components of the picture signal that is output from the image sensor to which the mosaic-type color filter is mounted.

When a mosaic-type color filter as shown in FIG. 7 is attached in the above-mentioned image sensor 11, each color component in the image data D0(n) continues every half period of each horizontal scanning period. For example, in the horizontal scanning period corresponding to the pixels of the odd-numbered lines to which the W and G components are alternately mapped, the W components follow in succession in the first half period, while the G components follow in succession in the second half period as shown in FIG. 13. In the horizontal scanning period corresponding to the pixels of the even-numbered lines to which the Cy and Ye components are alternately mapped, the Cy components follow in succession in the first half period and the Ye components follow in succession in the second half period. Thus, even if the information charges of two pixels are summed in the horizontal direction, different color components do not mix so that appropriate processing can be performed at the signal processing circuit.

Figure 14:
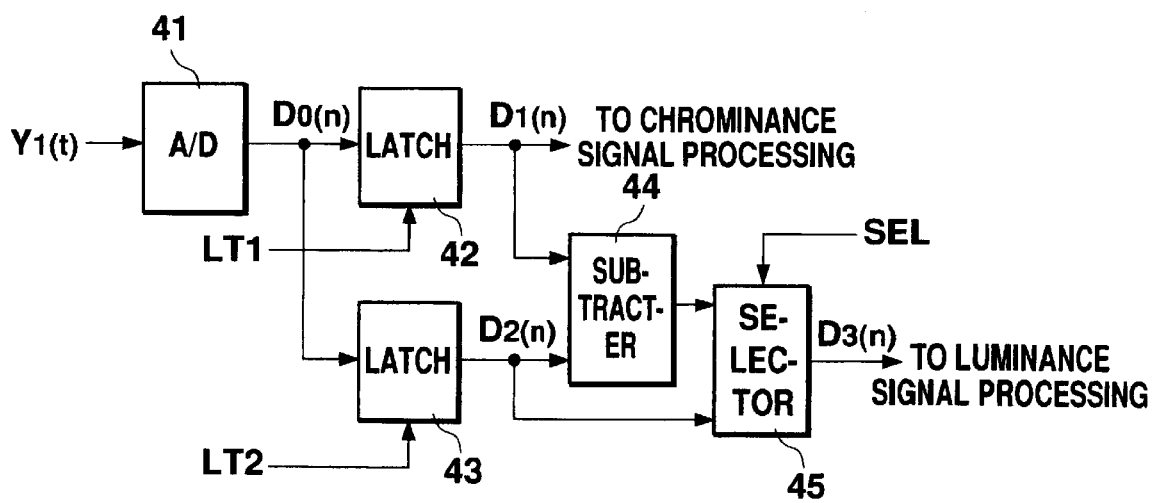
FIG. 14 is a block diagram showing one part of a signal processing circuit for the picture signal used in the solid-state image pickup apparatus shown in FIG. 9.

FIG. 14 is a block diagram showing the configuration of an input step of a signal processing circuit for performing signal processing for the image signal Y1(t) output from the sample-and-hold circuit 24. The signal processing circuit in this figure performs signal processing for image signal Y1(t) by summing the information charges for two pixels at the output section 21d of the image sensor 21 in accordance with FIGS. 10 and 13.

The signal processing circuit comprises an A/D converter circuit 41, latch circuits 42, 43, a subtracter circuit 44, and a selector circuit 45. The signal processing circuit further comprises a chrominance signal processing system for white balance adjustment and balanced modulation, and a luminance signal processing system for two-dimensional filter processing and outline correction.

The A/D converter circuit 41, the first latch circuit 42, the second latch circuit 43, and the subtracter circuit 44 respectively correspond to the A/D converter circuit 16, the first latch circuit 17, the second latch circuit 18, and the subtracter circuit 19 shown in FIG. 5 so their description will not be repeated.

Figure 15:
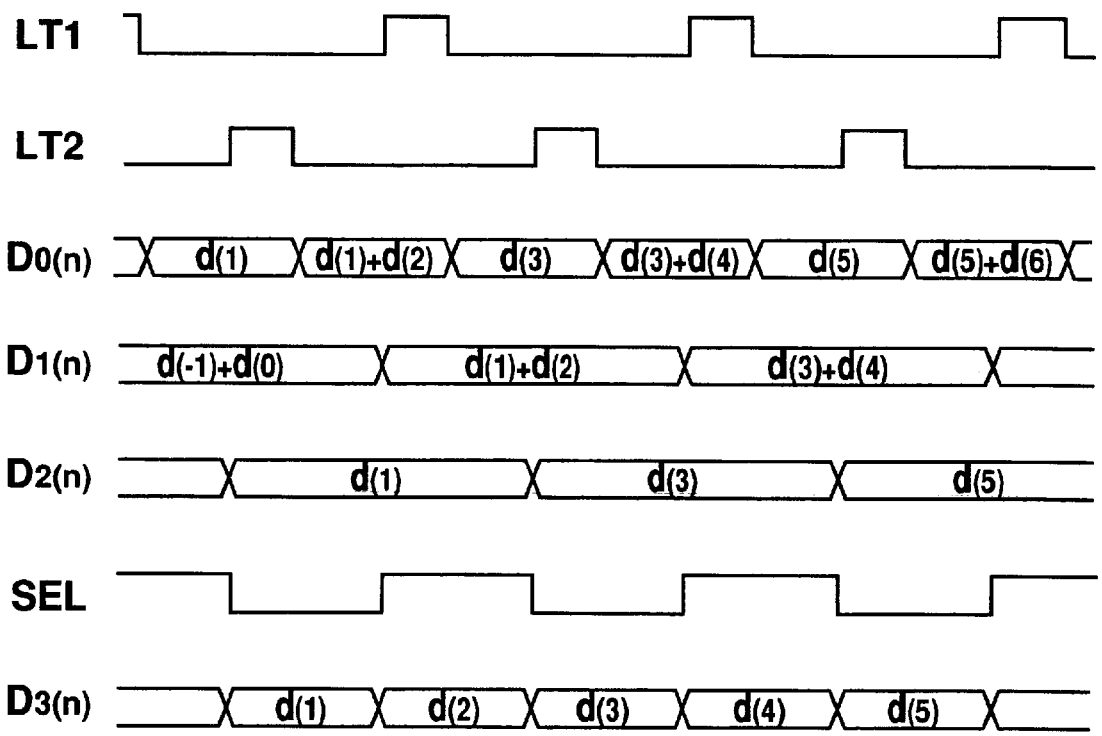
FIG. 15 is a timing chart illustrating the operation of the signal processing circuit shown in FIG. 14.

FIG. 15 is a timing chart illustrating the operation of the signal processing circuit shown in FIG. 14.

The selector circuit 45 selects, in response to the selection pulse SEL, the subtraction result of either the subtracter circuit 44 or the image data D2(n), and outputs image data D3(n) representing the information charge of one pixel. In other words, image data D2(n) is selected at the period during input of data d(2m−1) representing the information charge of one pixel, and the output of the subtracter circuit 44 is selected at the period during input of data d(2m−1)+d(2m) representing the information charge of two pixels. Therefore, image data D3(n) representing only the information charge of each pixel prior to summing up at the output section 21d of the image sensor 21 is generated.

Image data D1(n) representing the information charge of two pixels that are output from the first latch 42 is supplied to the signal processing system to yield the chrominance signal, and image data D3(n) representing the information charge of one pixel that is output from the selector circuit 45 is supplied to the signal processing system to yield the luminance signal. In the generation of the chrominance signal, the number of data items has little effect on the resolution of the reproduced image. Therefore, even if the number of data items is halved, the image data D3(n) representing the information charge of two pixels having a sufficient level is used. In comparison, in the generation of the luminance signal, the number of data items directly affects the resolution of the reproduced image so the image data D1(n) is used in which the number of data items is maintained.

However, when the information charges for two pixels are combined and the image signal Y0(t) is extracted, degradation of the resolution in the horizontal direction is unavoidable. By inverting a combination of two pixels information charges at every vertical scanning period as a simulated interlaced drive, degradation of the resolution can be minimized.

Figure 16:
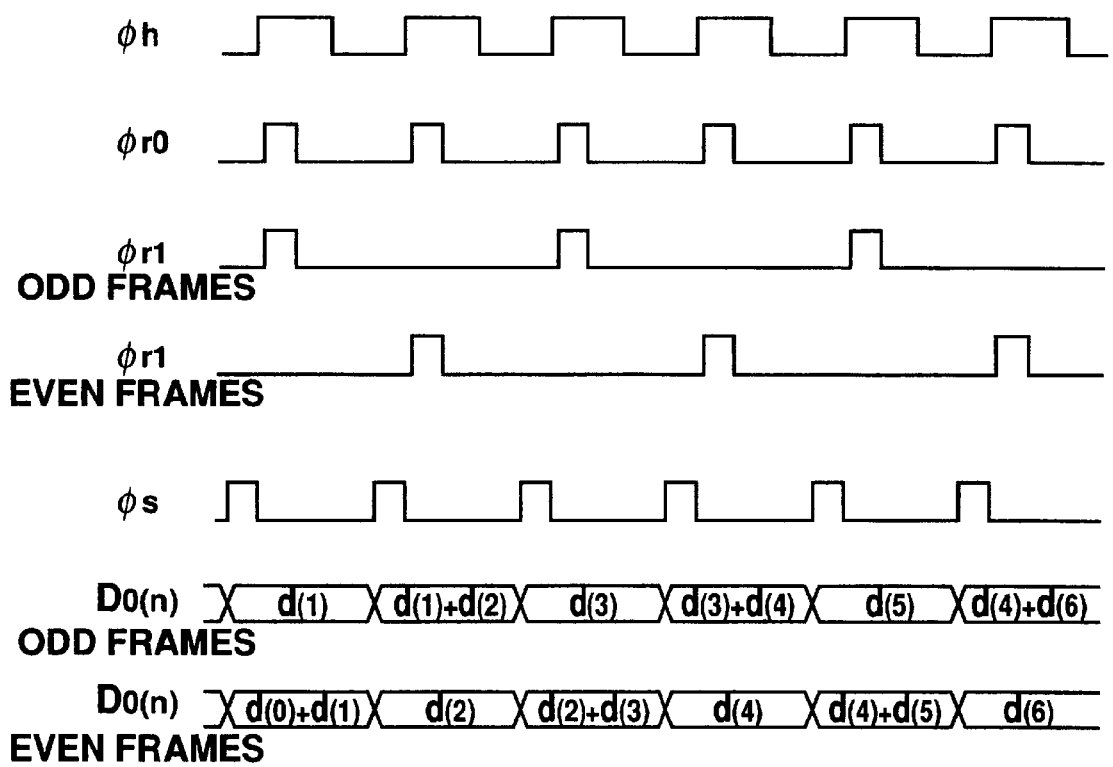
FIG. 16 is a timing chart illustrating a third operation of the solid-state image pickup apparatus shown in FIG. 9.

FIG. 16 is a timing chart illustrating an operation when inverting two pixels, which sum up information charges, at the odd-numbered vertical scanning period (odd frames) and at the even-numbered vertical scanning period (even frames).

In this case, the divided reset clock φr1 is divided into timings for the odd-numbered frames and for the even-numbered frames, in other words, two timings of a reduced number of pulses shifted from each other by one clock period. Therefore, the divided reset clock φr1 has twice the length of the period of the reset clock φr0, and a phase difference of half a period between the odd-numbered frames and the even-numbered frames. If the image signal Y1(t) is obtained with the divided reset clock φr1, the combination of two pixels summed up at the output section 21d of the image sensor 21 changes places with the odd-numbered frames and the even-numbered frames. The combination exchange of two pixels summing information charges may be performed in the vertical scanning periods or in the horizontal scanning periods. It may be more effective to use the combination exchange in the vertical scanning period and the combination exchange in the horizontal scanning period together.

In the above-mentioned embodiments, a case where information charges were summed in two pixel units was illustrated. However, at the output section of the image sensor, the information charges for three or more pixels may be summed up. This is easily accomplished by changing the proportion for obtaining the divided reset clock φr1 from the reset clock φr0. Further, it is sufficient to provide latch circuits in parallel for the number of pixels summing up the information charges so that the output voltage value at each step where the information charges for a plurality of pixels are summed up can be respectively latched.

Regarding the signal processing system for the image signal, instead of using latch circuits, image data for one line or for one picture can be stored to memory and the image data for every pixel can be calculated through digital signal processing. If a subtraction process is added as preprocessing for the various operations in the processing of the digitized image signal, such as in the processing for filtering and color encoding, the image data for every pixel can be easily extracted.

According to the present invention, the output section of the image sensor can sum up and output the information charges of a plurality of pixels. Thus, even if the information charge amount of every pixel becomes small, conversion to voltage values based on a certain charge amount is possible, thereby improving the S/N ratio at the output section. Because image data corresponding to the information charge amount for each pixel can be reproduced in the signal processing, the image data can be used to maintain the resolution of the reproduced image to the same level as when combining of pixels is not performed.

Furthermore, an image sensor to which is attached a mosaic-type color filter is easily adaptable because the color components can be separated after being initially mixed. Therefore, for an image sensor suited for color image capture also, the characteristics of the output section can be improved without degrading the resolution.

Furthermore, according to the present invention, when a mosaic-type color filter has an arrangement in which two different colors alternate in the horizontal direction, the output timing of information charges to the horizontal transfer section is shifted by only one half the horizontal scanning period between the odd and even columns of the vertical shift register. The mixing of color components is thereby eliminated, enabling the signal processing for the image signal to be output to be accurately performed.

Furthermore, the chrominance signal has little effect on the resolution of the reproduced image and is obtained from the output where information charges of a plurality of pixels are summed. On the other hand, the luminance signal, which directly effects the resolution of the reproduced image, is obtained based on the information charge of every pixel. For this reason, the color reproduction of the reproduced image can be maintained in color image capture without degrading the resolution.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A solid-state image pickup apparatus comprising:
an image sensor, in which a plurality of pixels arranged in the form of a matrix connect in every column to a plurality of vertical transfer sections, outputs of which in turn connect to respective bits of a horizontal transfer section, for converting an output charge amount of the horizontal transfer section into a voltage value to be output;
a drive circuit for transferring information charges accumulated in said plurality of pixels to said plurality of vertical transfer sections, from said plurality of vertical transfer sections to said horizontal transfer section for every horizontal line, and further from said horizontal transfer section to an output section, and for discharging the information charges that store in said output section in synchronization with the transfer operation of said horizontal transfer section; and
a detector circuit for extracting in synchronization with the discharge operation of said drive circuit the voltage value hat is output from said output section; wherein:
said drive circuit sets a period for the discharge operation of said output section to an integral multiple of the period of the transfer operation of said horizontal transfer section to accumulate in said output section the information charges for a plurality of pixels; and
said detector circuit samples an output of said output section in synchronization with the transfer operation of said horizontal transfer section to extract a potential corresponding to an information charge amount for one pixel and a potential corresponding to an information charge amount for a plurality of pixels.

2. A solid-state image pickup apparatus comprising:
an image sensor, in which a plurality of pixels arranged in the form of a matrix connect in every column to a plurality of vertical transfer sections, outputs of which in turn connect to respective bits of a horizontal transfer section, for converting an output charge amount of the horizontal transfer section into a voltage value to be output;
a drive circuit for transferring information charges accumulated in said plurality of pixels to said plurality of vertical transfer sections, from said plurality of vertical transfer sections to said horizontal transfer section for, every horizontal line, and further from said horizontal transfer section to an output section, and for discharging the information charges that store in said output section in synchronization with the transfer operation of said horizontal transfer section;
a detector circuit for extracting in synchronization with the discharge operation of said drive circuit the voltage value that is output from said output section; and
a signal processing circuit for latching a detection potential of said detector circuit at every step and calculating the information charge amount of each pixel from the respective differences; wherein
said drive circuit sets a period for the discharge operation of said output section to an integral multiple of the period of the transfer operation of said horizontal transfer section to accumulate in said output section the information charges for a plurality of pixels; and
said detector circuit extracts in step fashion a change in potential during the process where information charges of a plurality of pixels sequentially store at said output section in synchronization with the transfer operation of said horizontal transfer section.

3. A solid-state image pickup apparatus comprising:
an image sensor, in which a plurality of pixels arranged in the form of a matrix and mapped respectively to segments of a color filter connect in every column to a plurality of vertical transfer sections, outputs of which in turn connect to respective bits of a horizontal transfer section, for converting the output charge amount of the horizontal transfer section into a voltage value to be output;
a drive circuit for transferring information charges accumulated in said plurality of pixels to said plurality of vertical transfer sections, from said plurality of vertical transfer sections to said horizontal transfer section for every horizontal line, and further from said horizontal transfer section to an output section, and for discharging the information charges that store in said output section in synchronization with the transfer operation of said horizontal transfer section; and
a detector circuit for extracting in synchronization with the discharge operation of said drive circuit the voltage value that is output from said output section; wherein:
said drive circuit-transfers information charges to said horizontal transfer section in odd-numbered columns and even-numbered columns of said plurality of vertical transfer sections alternately, and sets a period for the discharge operation of said output section to an integral multiple of the period of the transfer operation of said horizontal transfer section to store in said output section the information charges for a plurality of pixels; and said detector circuit extracts in step fashion a change in potential during the process where information charges of a plurality of pixels sequentially store at said output section in synchronization with the transfer operation of said horizontal transfer section.

4. A solid-state image pickup apparatus according to claim 3 further comprising a signal processing circuit for generating a chrominance signal based on the final potential when information charges for a predetermined number of pixels store in the detection potential of said detector circuit, and generating a luminance signal based on the difference between the potential when the information charge for one pixel stores and each potential in the process where a plurality of information charges store for said final potential.

5. A solid-state image pickup apparatus according to claim 3 wherein said drive circuit shifts the timing of the output operation of said output section by one period of the transfer operation of said horizontal transfer section in each vertical scanning period or each horizontal scanning period of said image sensor.

6. A solid-state image pickup apparatus comprising:

an image pickup device having a plurality of pixels arranged in the form of a matrix for generating and accumulating information charges corresponding to incident light, a plurality of parallel vertical shift registers for vertically transferring a plurality of information charge packets respectively read out from said pixels, a horizontal shift register receiving in sequence said information charge packets that are respectively output from said vertical shift registers and horizontally transferring said plurality of information charge packets, and an output section for storing said information charges that are output at every horizontal transfer period from said horizontal shift register and outputting a signal corresponding to the stored information charges;

a drive circuit for transferring said information charges from said pixels to said vertical shift registers, driving the vertical transfers for said vertical shift registers, driving the horizontal transfers for said horizontal shift register, and driving the output section so as to discharge said information charges that have stored in said output section; and a detector circuit for sampling at a predetermined period said signal that is output from said output section; wherein:

said drive circuit sets the period of said discharge operation for said information charges that have stored in said output section to an integral multiple of said horizontal transfer period so that said output section sequentially stores one pixel at a time said information charges for a plurality of said pixels and outputs said signal, the signal level of which changes in a step fashion; and a said detector circuit performs sampling for said signal at every said horizontal transfer period so that said signal level of each said step is respectively sampled.

7. A solid-state image pickup device according to claim 6 further comprising a signal processing circuit including a plurality of latch circuits for latching sampling values output from said detector circuit at every said plurality of steps and a subtracter circuit for calculating the differences of the latched sampling values output from two said latch circuits corresponding to two adjacent steps, for obtaining said information charge amount for the pixels.

8. A solid-state image pickup apparatus according to claim 6 wherein:

said image pickup device includes a color filter, in which a plurality of types of segments for passing different light color components are arranged systematically, attached on said plurality of pixels; and in said image pickup device, the odd-numbered columns of said vertical shift registers and the even-numbered columns of said vertical shift registers have different numbers of bits, and the transfer between registers for passing said information charge packets from said vertical shift registers to said horizontal shift register is performed alternately between an odd-numbered column group and an even-numbered column group of said vertical shift registers.

9. A solid-state image pickup apparatus according to claim 8 wherein said color filter has said segment of same color disposed alternately in the horizontal direction of the matrix of said pixels.

10. A solid-state image pickup apparatus according to claim 9 further comprising a signal processing circuit, said signal processing circuit comprising:

a plurality of latch circuits for respectively latching sampling values output from said detector circuit at every said plurality of steps, a subtracter circuit for calculating the differences among a plurality of latched sampling values that are output from said latch circuits, a luminance signal generating circuit for generating a luminance signal based on said differences, and a chrominance signal generating circuit for generating a chrominance signal based on, among said latched plurality of sampling values, the sampling values corresponding to said steps that have stored said information charges for said plurality of pixels.

11. A solid-state image pickup apparatus according to claim 10 wherein said chrominance signal generating circuit generates said chrominance signal based on the latched sampling value that corresponds to said signal immediately prior to said discharge operation of said output section.

12. A solid-state image pickup apparatus according to claim 6 wherein an additional bit is added to the output side of either the odd-numbered columns of said vertical shift registers or the even-numbered columns of said vertical shift registers, and said drive circuit drives said additional bit together with each bit of said vertical shift registers so that the timing of said transfer between registers for said odd-numbered column group and the timing of said transfer between registers for said even-numbered column group differ from one another by only half the horizontal scanning period.

13. A solid-state image pickup apparatus according to claim 6 wherein said drive circuit shifts the timing of said discharge operation of said output section at predetermined periods, said periods being integral multiples of the vertical scanning period and/or integral multiples of the horizontal scanning period of said image pickup device, by predetermined integral multiples of said horizontal transfer period.

* * * * *